(12) United States Patent
Ogata

(10) Patent No.: US 7,095,535 B2
(45) Date of Patent: Aug. 22, 2006

(54) ORIGINAL SCANNING APPARATUS

(75) Inventor: Atsushi Ogata, Shizuoka (JP)

(73) Assignee: Canon Kabushiki Kaisha, Tokyo (JP)

(*) Notice: Subject to any disclaimer, the term of this patent is extended or adjusted under 35 U.S.C. 154(b) by 913 days.

(21) Appl. No.: 10/180,040

(22) Filed: Jun. 27, 2002

(65) Prior Publication Data
US 2003/0007198 A1 Jan. 9, 2003

(30) Foreign Application Priority Data
Jul. 5, 2001 (JP) ............... 2001-204929

(51) Int. Cl.
*H04N 1/04* (2006.01)
*H04N 1/40* (2006.01)

(52) U.S. Cl. ............ 358/475; 358/471; 358/474; 358/496

(58) Field of Classification Search ........ 358/474, 358/471, 497, 494, 473, 472, 482, 483, 487, 358/400, 406, 504, 512–514, 500, 496, 505, 358/506; 382/313, 312, 318, 319; 399/94, 399/92, 91, 211, 212, 206, 220, 221
See application file for complete search history.

(56) References Cited

U.S. PATENT DOCUMENTS 4,760,609 A * 7/1988 Tamagaki ............... 382/167
5,281,994 A * 1/1994 Fukuda et al. ............ 355/66
5,585,627 A * 12/1996 Akutsu et al. ............ 250/234
5,860,042 A * 1/1999 Tomaru et al. ............ 399/92
6,445,836 B1 * 9/2002 Fujiwara .................. 382/312

FOREIGN PATENT DOCUMENTS

| JP | 61093422 A | * | 5/1986 |
| JP | 05107653 A | * | 4/1993 |
| JP | 07303174 A | * | 11/1995 |
| JP | 2002033888 A | * | 1/2002 |
| JP | 2002232650 A | * | 8/2002 |

* cited by examiner

*Primary Examiner*—Cheukfan Lee
(74) *Attorney, Agent, or Firm*—Fitzpatrick, Cella, Harper & Scinto

(57) ABSTRACT

Deformation of a second optical carriage (B) due to heat is large on a (C) side where an inverter (31) is attached and small on a (D) side. A mirror supporting portion inside the second optical carriage (B) supports the mirror at one point on the (C) side and at two points on the (D) side. An angle of the reflecting mirror (8) depends on two protrusions on the (D) side where thermal deformation is small, and the mirror is supported at one point on the (C) side where thermal deformation is large. Thus, even if an angle of the mirror supporting portion (C) changes, the angle of the reflecting mirror (8) is not affected. Therefore, a change in the angle of the reflecting mirror (8) can be controlled to be small when temperature of the second optical carriage (B) rises during a reading operation, and decrease in reading accuracy due to thermal deformation of the second optical carriage (B) can be suppressed.

8 Claims, 5 Drawing Sheets

ORIGINAL SCANNING APPARATUS

BACKGROUND OF THE INVENTION

1. Field of the Invention

The present invention relates to an original scanning apparatus for scanning an original, and particularly, to an apparatus having a reflecting member for reflecting light from an original.

2. Description of the Related Art

A reading optical system in an image reading apparatus functioning as an original scanning apparatus is constituted of a light source, a reflecting mirror, a lens, a reading sensor and the like.

Conventional image reading apparatuses include the following two types. One is an image reading apparatus with an optical system of an integral optical carriage system that has all elements of the optical system in one optical carriage. The other is an image reading apparatus with an optical system of a mirror movement system in which a lens and a reading sensor are fixed to a main body of the image reading apparatus and a first optical carriage having a light source and a mirror and a second optical carriage having a plurality of mirrors move while keeping a fixed optical path length.

In both the image reading apparatuses, in order to cause reflected light from an original to be accurately incident on a reading sensor, positions and angles of a plurality of mirrors for guiding light to the reading sensor need to be set in a carriage with extremely high accuracy.

In general, a mirror is a plate-like reflecting member and supported on supporting means by three-point support and this supporting means is fixed to a carriage.

In addition, a carriage of an optical system is generally formed of a resin material because it has advantages in terms of molding characteristics, costs, weight and the like.

Incidentally, the carriage has a light source and a heat source such as an inverter for driving the light source. Thus, when reading of images is continued for a long time, temperature of the carriage rises to cause deformation of resin.

Then, when the resin material is deformed by expansion or the like due to thermal deformation, supporting portions of reflecting mirrors move and deform, whereby positions and angles of the mirrors change to cause such a problem in that reflected light from the mirrors is not incident on a reading sensor accurately.

In particular, in an image reading apparatus according to an image flow reading system which is provided with an automatic feeding mechanism of an original and reads an image by moving an original in a state in which an optical system is fixed, since the optical system is continuously in a reading state while a plurality of originals set in the automatic feeding mechanism are read, deterioration of reading accuracy due to the rise of temperature is a critical problem.

SUMMARY OF THE INVENTION

The present invention has been devised in view of the above and other drawbacks, and it is an object of the present invention to provide an original scanning apparatus for constantly maintaining a posture of a reflecting member even with the influence of heat and performing stable scanning of an original.

Another object of the present invention is to provide an original scanning apparatus including: a reflecting member for reflecting light from an original; supporting means for supporting the reflecting member; and a heat source for generating heat, in which: the supporting means supports a first end of the reflecting member at one point and supports a second end on the opposite side of the first end at two points; and the heat source is provided on the first end side.

Still another object of the present invention is to provide an original scanning apparatus including: a reflecting member for reflecting light from an original; supporting means for supporting the reflecting member; and cooling means for cooling the apparatus, in which: the supporting means supports a first end of the reflecting member at one point and supports a second end on the opposite side of the first end at two points; and the cooling means is provided on the second end side.

Still another objects of the present invention will be apparent from the following description.

DETAILED DESCRIPTION OF THE PREFERRED EMBODIMENTS

Embodiments of the present invention will be hereinafter described with reference to the accompanying drawings.

First Embodiment

Figure 1:
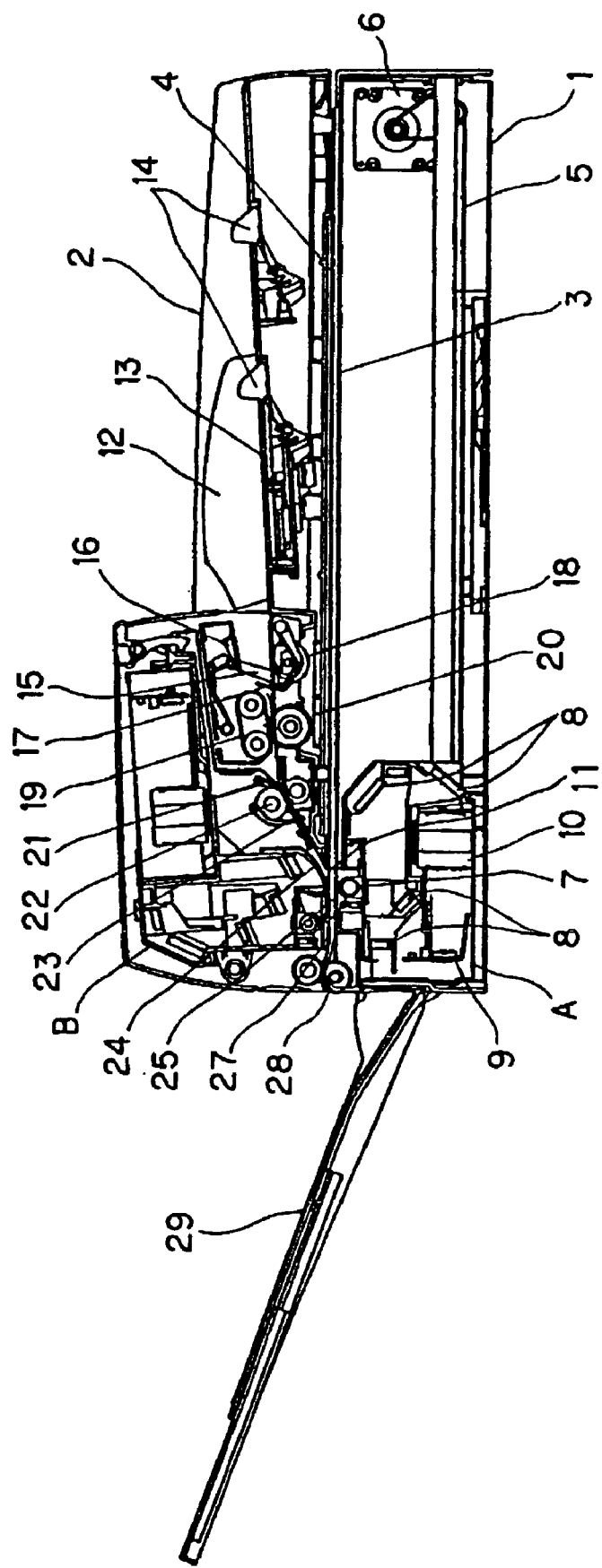
FIG. 1 is a side sectional view schematically showing a structure of an image reading apparatus in accordance with a first embodiment.

A first embodiment of the present invention will be described with reference to FIGS. 1 to 5. FIG. 1 is a side sectional view schematically showing a structure of an image reading mechanism (image reading apparatus) functioning as an original scanning apparatus in accordance with the first embodiment of the present invention. In addition, FIG. 2 is an enlarged side sectional view showing an original conveying unit of the mechanism.

Figure 2:
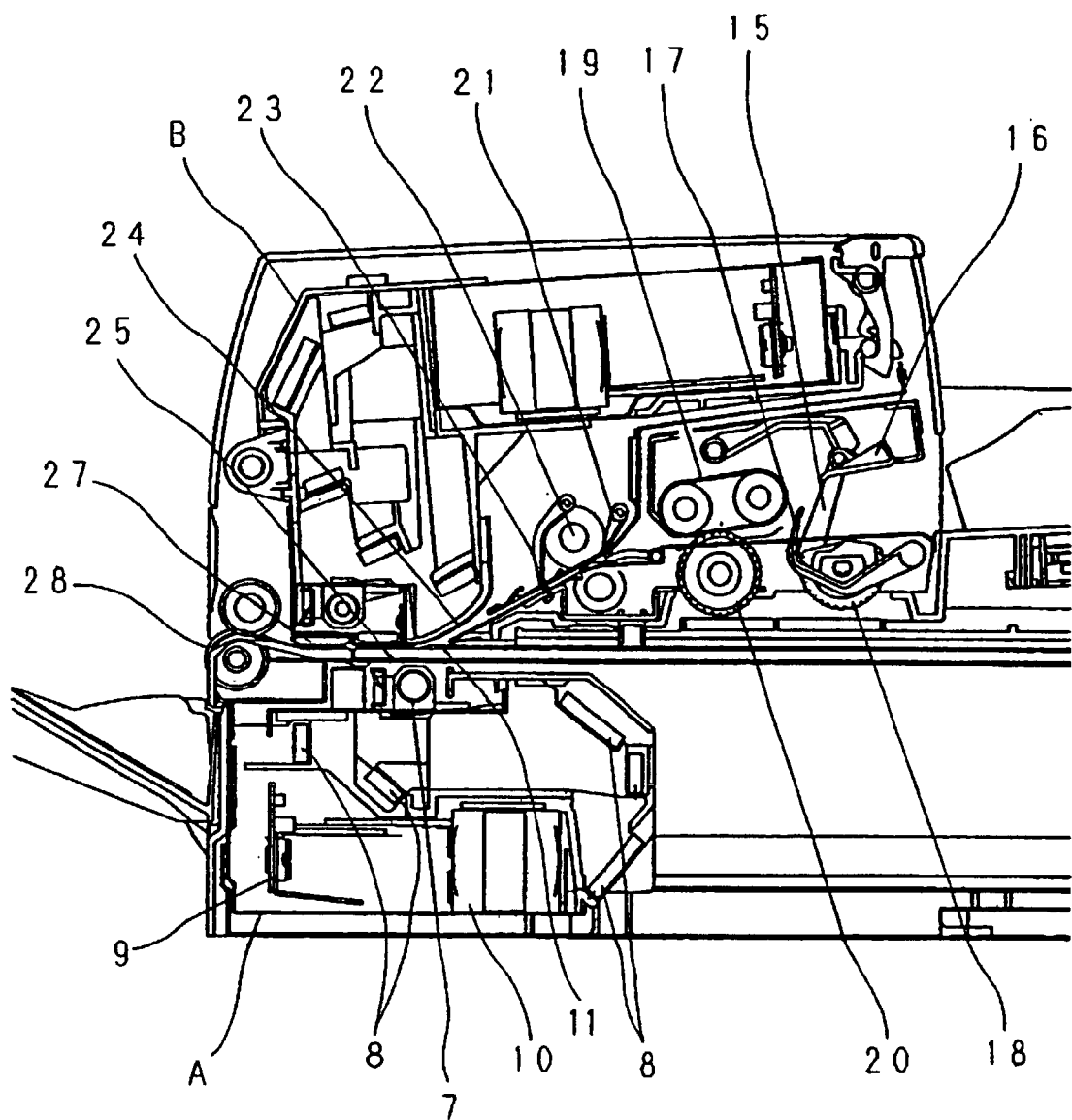
FIG. 2 is a detailed view showing an original conveying unit of the image reading apparatus in accordance with the first embodiment.

As shown in FIGS. 1 and 2, the image reading apparatus is constituted of a flat bed (FB) image reading unit (FB unit) 1 for mounting and fixing an original and reading its surface image and an automatic sheet-feeding device (ADF unit) 2 attached to an upper surface of the FB unit 1. Moreover, a part of the FB unit 1 and a part of the ADF unit 2 are combined to form an image flow reading unit.

The FB unit 1 is a mechanism for scanning and reading a surface image of an original mounted and fixed thereon. The FB unit 1 is provided with a reference original stand glass 3 functioning as a translucent plate member on an upper surface of which an original is mounted and also provided with a first optical carriage A functioning as first image reading means for reading an original below the original stand glass 3.

The first optical carriage A is coupled to an endless driving belt 5. Further, this driving belt 5 is coupled to a driving motor 6.

Power of the driving motor 6 is transmitted to the first optical carriage A via the driving belt 5, whereby the first optical carriage A is movable in parallel with the original stand glass 3.

This first optical carriage A is provided with both a function of reading an image of an original mounted and fixed on the original stand glass 3 and a function of staying in a fixed position for reading an image on an original that is being conveyed (image flow reading function).

A lamp 7 functioning as a light source disposed on an upper surface of the first optical carriage A is a light source for irradiating light to an original. Light reflected from the original by the light irradiation of the lamp 7 is guided to a CCD 9 functioning as a reading sensor by reflecting mirrors 8 functioning as reflecting members and a condensing lens 10 functioning as a condensing member.

The CCD 9 is a photoelectric conversion element for converting incident light to an electric signal. In addition, an original abutting reference plate 11 is provided on the original stand glass 3.

On the other hand, the ADF unit 2 is provided with an original stacking tray 13 for mounting and stacking an original thereon. An original on the original stacking tray 13 is regulated by an original side regulating plate 12 on its both sides in a conveying (feeding) direction. In addition, an original existence sensor 15 recognizes the existence of an original by detecting a leading edge of the original with its lever. Moreover, an original length detecting lever 14 detects a length of the original.

In addition, the ADF unit 2 is also provided with a weight 16 for pressing down a leading edge of an original delivered from the original stacking tray 13 and an original shutter 17 for preventing the leading edge of the original from entering a separating and feeding unit.

A pickup roller 18 has a function of letting out stacked originals one after another from the lowermost one. The original let out by the pickup roller 18 is conveyed to the image flow reading unit by a feeding roller 20 provided on the downstream side. In addition, a separating belt 19 provided in a position opposing the feeding roller 20 across a conveying path of an original is driven to rotate in a direction opposite to a rotating direction of the feeding roller 20, thereby separating stacked originals so that the originals are surely delivered one by one.

A pre-registration sensor lever 21 detects a leading edge of an original to take timing for making a loop of the original.

A registration roller pair 22 delivers a conveyed original to the first optical carriage A at predetermined timing. An original leading edge detecting lever 23 detects the leading edge of the original delivered by the registration roller pair 22.

An upper original conveying guide 24 functioning as guiding means is provided so as to oppose the original stand glass 3 and guides an original to a first reading part 25. The first reading part 25 is a predetermined gap provided between the original stand glass 3 and the upper original conveying guide 24.

An image contained in one surface of an original (first surface) is scanned and read by the first optical carriage A staying in a fixed position when the original passes through the first reading part 25.

A second optical carriage B functioning as second image reading means is provided in a position opposing the first optical carriage A across the original stand glass 3 in the ADF unit 2 functioning as holding means for holding the second optical carriage B.

The light source 7, the reflecting mirrors 8, the CCD 9 and the lens 10, which are the same as those in the first optical carriage A, are arranged in the second optical carriage B.

In this way, the second optical carriage B provided with substantially the same structure as the first optical carriage A scans and reads an image contained in the other surface of the original (second surface) in a second reading part 27. The second reading part 27 is set slightly on a downstream side of the first reading part 25 on a conveying path of an original along the original stand glass 3.

The original is discharged to the outside of the FB unit 1 by a discharge roller pair 28 after passing through the first and second reading parts 25 and 27. A discharge stacking tray 29 for stacking originals discharged by the discharge roller pair 28 is provided on one side of the FB unit 1.

Figure 3:
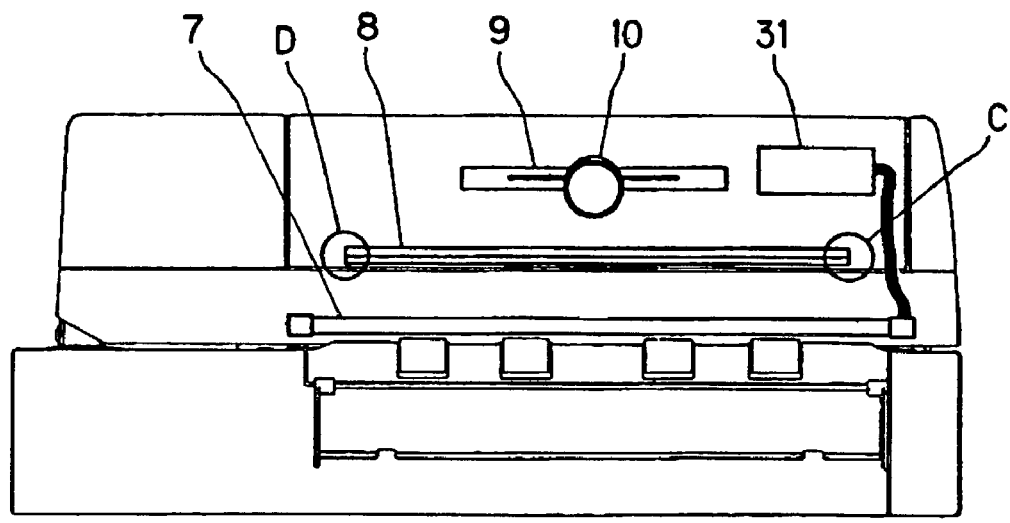
FIG. 3 is a side view showing the image reading apparatus in accordance with the first embodiment.

FIG. 3 is a schematic view showing the second optical carriage B viewed from the discharge stacking tray 29 side. As shown in FIG. 3, an inverter 31 for driving the lamp 7 is provided inside the second optical carriage B. The inverter 31 is a heat source for generating heat.

Figure 4:
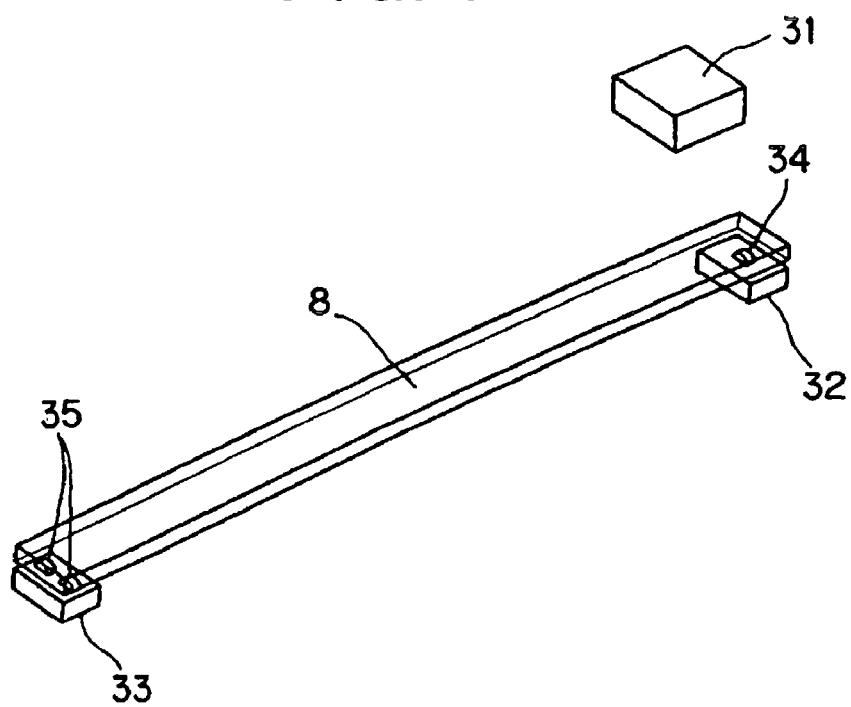
FIG. 4 is an explanatory view showing a mirror supporting method of the image reading apparatus in accordance with the first embodiment.

FIG. 4 is a view illustrating the supporting portions of the reflecting mirrors 8 in the first and second optical carriages A and B. In mirror supporting portions 32 and 33 functioning as supporting means in the first and second optical carriages A and B for supporting both the ends of the reflecting mirror 8 in its longitudinal direction that is its reading width direction, one projection 34 is formed on the supporting portion 32 and two projections 35 are formed on the other supporting portion 33 on the opposite side of the supporting portion 32. The reflecting mirror 8 is mounted on these projections 34 and 35 and fixed to the first and second optical carriages A and B such that the reflecting mirror 8 and the supporting portions 32 and 33 are nipped by a fixing member.

Figure 5A:
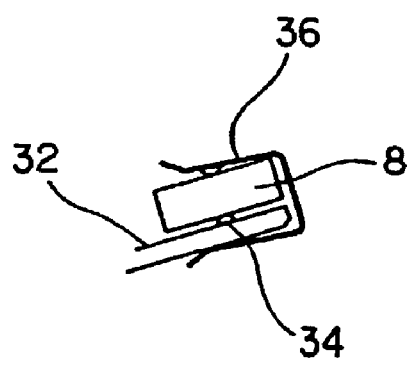
FIGS. 5A and 5B are explanatory views showing the mirror supporting method of the image reading apparatus in accordance with the first embodiment.
Figure 5B:
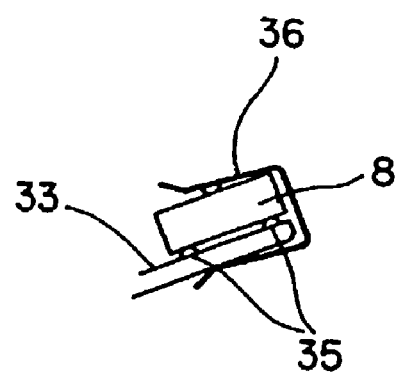

FIGS. 5A and 5B are enlarged views showing the vicinities of the mirror supporting portion 32 and 33. FIG. 5A shows a side where the reflecting mirror 8 is supported at one point, which is its first end side C. FIG. 5B shows a side where the reflecting mirror 8 is supported at two points, which is its second end side D. The reflecting mirrors 8 are nipped by clips 36 and fixed to the mirror supporting portions 32 and 33 of the first and second optical carriages A and B, respectively.

Operations of the original scanning apparatus having the above-described structure will be hereinafter described.

(Original Stationary Reading System)

In the case of image reading that is original scanning in the FB unit 1, the ADF unit 2 is opened to place an original on the original stand glass 3, and the original is set by abutting its leading edge on the original abutting reference plate 11.

Next, the original is pressed and fixed to the original stand glass 3 by a pressure plate 4 as the ADF unit 2 is closed. Consequently, curl or the like of the original is corrected and, at the same time, the original is brought into close contact with the original stand glass 3. Thereafter, reading of the original is started as an operator presses an original reading start button provided on a not-shown control panel.

Then, first, the driving belt 5 starts operation upon supply of power by the driving motor 6, and the first optical carriage A moves to a predetermined initial position accordingly. The first optical carriage A is accelerated until a predetermined speed is reached while moving from the initial position to an original reading position.

After the predetermined speed is reached, the first optical carriage A reaches the leading edge position of the original abutted on the original abutting reference plate 11 while keeping the speed. Thereafter, the first optical carriage A continues to move while keeping the predetermined speed to read the original. After reading the entire surface of the original, the first optical carriage A rotates in a direction opposite to the reading direction by reverse driving of the driving motor 6 to return to a predetermined standby position.

(Original Flow Reading System)

Next, a case of image reading that is original scanning of a flow reading system will be described. In the case of the flow reading, an original is stacked on the original stacking tray 13 of the ADF unit 2. The ADF unit 2 can realize that the original is placed on the original stacking tray 13 according to the detection of the original length detecting lever 14 and the original existence sensor 15. In addition, an operator sets a width of an original with the original side regulating plate 12, whereby the ADF unit 2 can realize a size of the original according to the combination of the detection of the original length detecting lever 14 and the width.

In the above-described state, when the operator presses the not-shown original reading start button, the original shutter 17 regulating the leading edge of the original is opened, and a bundle of originals are conveyed to an original separating portion by the weight 16 and the pickup roller 18. Next, the originals are separated and fed one by one by the separating belt 19 and the feeding roller 20.

After the leading edge of the original reaches the registration roller pair 22 and a predetermined loop is formed by the pre-registration sensor lever 21, the rotation of the feeding roller 20 is stopped.

After predetermined timing, the registration roller pair 22 starts rotation to convey the original. The leading edge of the conveyed original is detected by the original leading edge detecting lever 23, and time when the original reaches the original reading position is determined.

The original is guided to the first reading part 25 by the upper original conveying guide 24. In the first reading part 25, images on one side of the original are read one after another by the first optical carriage A while the original is conveyed at a predetermined conveying speed.

In addition, the original reaches the second reading part 27, where images on the other surface of the original are read one after another by the reading unit of the second optical carriage B while the original is also conveyed at the predetermined speed.

The leading edge of the original passes through the second reading part 27, the original is conveyed by the discharge roller pair 28. After all the images on the original are read, the original is discharged onto the discharge stacking tray 29.

In the above-described first embodiment, the lamp 7 and the inverter 31 functioning as a heat source are provided inside each of the first and second optical carriages A and B. In the case of the second optical carriage B, the inverter 31 is attached to the end of the second optical carriage B, that is, a first end side of the reflecting mirror. Consequently, deformation of the second optical carriage B due to heat is large on a C side where the inverter 31 is attached and small on a D side.

The mirror supporting portion inside the second optical carriage B supports the mirror at one point on the C side and at two points on the D side. An angle of the reflecting mirror 8 depends on two projections on the D side where thermal deformation is small and the mirror is supported at one point on the C side where thermal deformation is large. Thus, even if an angle of the mirror supporting portion changes, the angle of the reflecting mirror 8 is not affected.

Therefore, a change in the angle of the reflecting mirror 8 can be controlled to be small when temperature of the second optical carriage B rises during a reading operation, and decrease in reading accuracy due to thermal deformation of the second optical carriage B can be suppressed. Further, the situation is the same for the first optical carriage A side.

(Second Embodiment)

Figure 6:
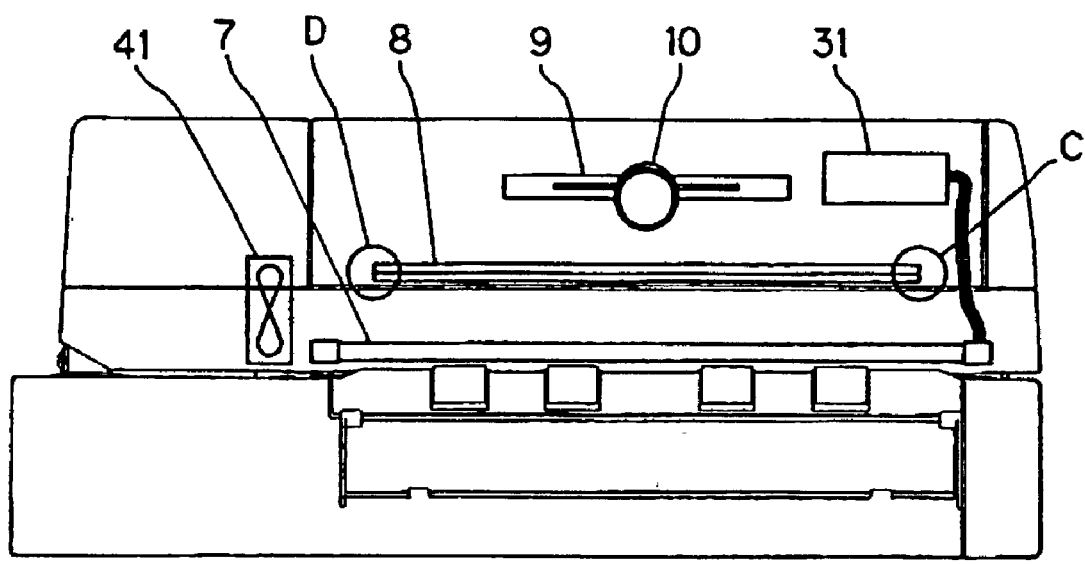
FIG. 6 is a side view showing an image reading apparatus in accordance with a second embodiment.

FIG. 6 shows a second embodiment of the present invention. FIG. 6 is a schematic view of the second optical carriage B in accordance with the second embodiment of the present invention which is viewed from the discharge stacking tray 29 side.

In this embodiment, in addition to the configuration of the first embodiment, a fan 41 functioning as cooling means is provided in an image reading apparatus to cool the second optical carriage B in order to suppress the rise of temperature in the second optical carriage B. In this case, in the mirror supporting portion inside the second optical carriage B, an end on a D side close to the fan 41 is supported at two points and an end on a C side distant from the fan 41 is supported at one point. That is, the fan 41 is provided on a second end side of a reflecting mirror.

The second optical carriage B is cooled more on the side close to the fan 41, which means that the end on the D side close to the fan 41 is cooled more. Thus, an amount of deformation on the D side of the second optical carriage B is small.

Therefore, a change in the angle of the reflecting mirror 8 can be controlled to be small when temperature of the second optical carriage B rises during a reading operation, and decrease in reading accuracy due to thermal deformation of the second optical carriage B can be suppressed. Further, the situation is the same for the first optical carriage A side.

In addition, although the fan 41 is provided in the image reading apparatus to cool the second optical carriage B from the outside in this embodiment, a fan may be provided inside an optical carriage to directly cool a heat source.

Figure 7:
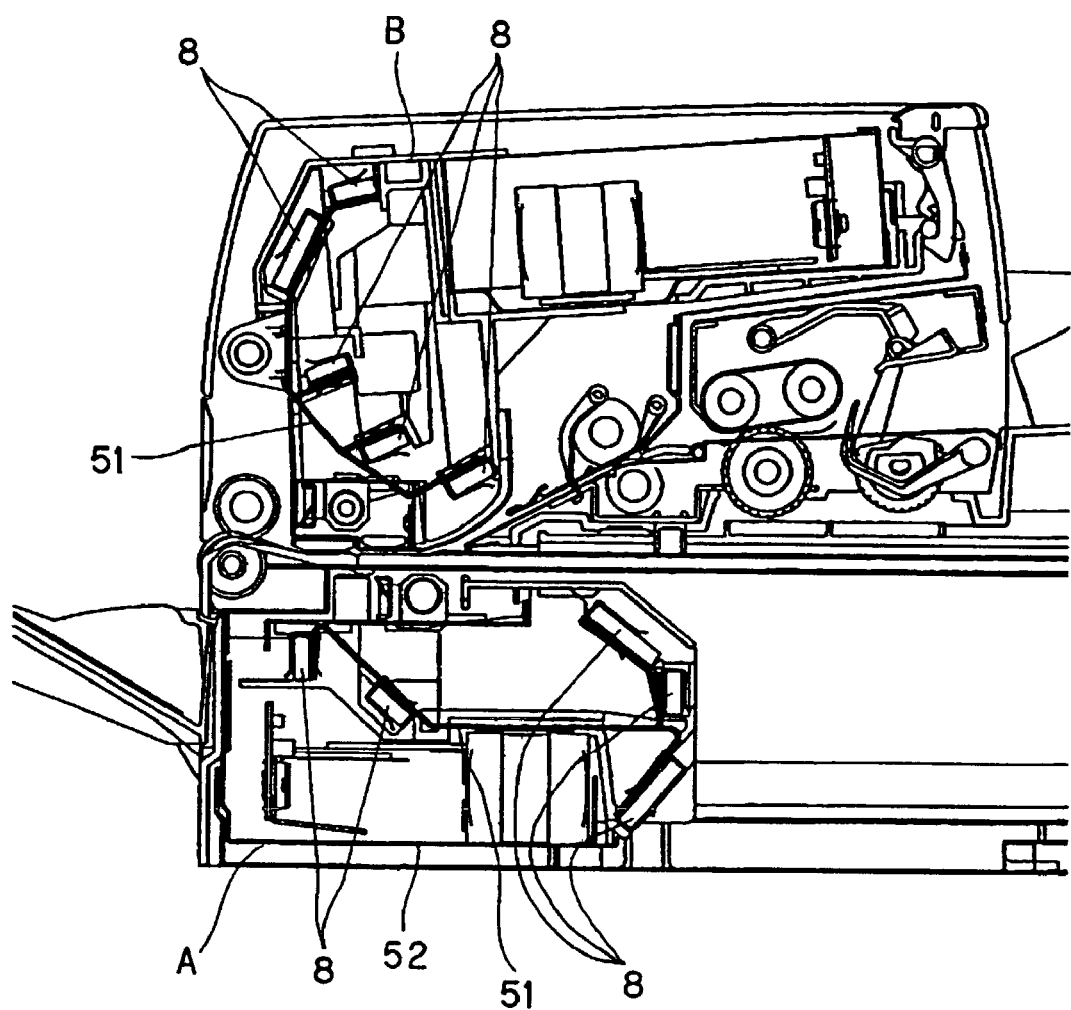
FIG. 7 is a side sectional view schematically showing a structure of a miller supporting portion of the image reading apparatus in accordance with the first and second embodiments.

FIG. 7 is a view illustrating the mirror supporting portion in accordance with the first and second embodiments.

All of the plurality of reflecting mirrors 8 fixed in the first and second optical carriages A and B are supported by a frame 51. The frame 51 is attached to each of the first and second optical carriages A and B in such a state of one unit.

The frame 51 is made of metal and has an amount of thermal deformation that is extremely small compared with those of the first and second optical carriages A and B constituted as units inside a resin frame 52. Thus, even if the first and second optical carriages A and B thermally deform during a reading operation, the change in the angle of the reflecting mirrors 8 can be controlled and decrease of reading accuracy can be suppressed.

Further, although the image reading apparatus is described in the above-described embodiments, the present invention may be applied to an image forming apparatus which includes the image reading apparatus as an image reading unit and forms an image of an original read by the image reading unit on a sheet. Examples of the image forming apparatus include image forming means of an electrophotographic system with which: exposure is performed on a photosensitive drum according to image information; an electrostatic latent image is developed by toner; and a toner image is transferred to a sheet or an ink jet system for discharging ink according to a read image. The present invention may be applied to any image forming apparatus as long as it has the image reading apparatus as an image reading unit.

As described above, according to the present invention, the angle of the reflecting member does not change even if the optical carriages are affected by heat from the heat source at the time of the reading operation, and the decrease of reading accuracy can be suppressed. Thus, stable image reading becomes possible even if image reading is continued for a long time.

The embodiments of the present invention have been described. However, the present invention is not limited to the above-described embodiments, and any modification is possible within technical thoughts of the present invention.

What is claimed is:

1. An original scanning apparatus comprising:
   a reflecting member for reflecting light from an original;
   supporting means for supporting said reflecting member, said supporting means supporting a first end of said reflecting member at one point and supporting a second end on the opposite side of said first end of said reflecting member at two points; and
   a heat source for generating heat; and
   cooling means for cooling the apparatus,
   wherein said heat source is provided on said first end side and said cooling means is provided on said second end side.

2. An original scanning apparatus according to claim 1, wherein said heat source is an inverter.

3. An original scanning apparatus according to claim 2, further comprising a light source for illuminating an original, said light source being driven by said inverter.

4. An original scanning apparatus according to claim 1, wherein said cooling means is a fan.

5. An original scanning apparatus according to claim 1, wherein said reflecting member has an elongated shape, and
   wherein said first end and said second end are ends in a longitudinal direction of said reflecting member, respectively.

6. An original scanning apparatus according to claim 1, wherein said supporting means has a metal frame.

7. An original scanning apparatus according to claim 6, further comprising a resin frame for supporting said supporting means.

8. An original scanning apparatus according to claim 7, further comprising:
   a light source for illuminating an original;
   a lens for condensing light from the original illuminated by said light source; and
   a sensor for converting the light condensed by said lens into an electric signal,
   wherein said resin frame supports said light source, said lens and said sensor.

* * * * *